United States Patent [19]

Aoyama

[11] Patent Number: 5,388,195
[45] Date of Patent: Feb. 7, 1995

[54] IMAGE PROCESSING SYSTEM WITH EDITING AREA CORRECTING FUNCTION

[75] Inventor: Teruyuki Aoyama, Ebina, Japan
[73] Assignee: Fuji Xerox Co., Ltd., Tokyo, Japan
[21] Appl. No.: 858,418
[22] Filed: Mar. 27, 1992
[30] Foreign Application Priority Data
  Mar. 28, 1991 [JP] Japan ................... 3-064441
[51] Int. Cl.⁶ .......................................... G06F 15/00
[52] U.S. Cl. ................................................ 395/146
[58] Field of Search ............... 395/145, 146, 148; 358/75, 448, 452, 453; 345/150, 151, 152

[56] References Cited

U.S. PATENT DOCUMENTS 5,113,251  5/1992  Ichiyanagi et al. .............. 358/75

Primary Examiner—Phu K. Nguyen
Attorney, Agent, or Firm—Finnegan, Henderson, Farabow, Garrett & Dunner

[57] ABSTRACT

An image processing system for editing and outputting image information obtained by reading a manuscript. An input unit inputs editing instructions including editing area and editing content. A display unit displays an area for editing instruction, and an edit processing unit processes the inputted editing instructions and sends editing instructions to an image processing unit, whereby editing content of said area is displayed on the display unit as the editing instruction, and the editing area is changed according to inputted correction of the editing area. Editing content of the editing area and the correction of the editing instruction can be confirmed on a display screen. The correction amount is displayed in numerical values by a bit map display overlapping and displaying the manuscript image information on the display unit or overlapping and displaying the manuscript image information on the editing area. A character display displays numerical values and characters. As the result, the correction amount can be quantitatively confirmed, and the position on the manuscript can be confirmed.

15 Claims, 6 Drawing Sheets

Area correction

A

B

IMAGE PROCESSING SYSTEM WITH EDITING AREA CORRECTING FUNCTION

BACKGROUND OF THE INVENTION

The present invention relates to an image processing system, which is provided with editing functions and edits and outputs image information obtained by reading a manuscript.

A digital copying machine comprises an image input terminal (IIT) for reading a manuscript, an image processing system (IPS) for processing the image data thus read, and an image output terminal (IOT) for driving, for example, a laser printer by the image data and outputs a copy. In the image input terminal, image information of the manuscript is picked up as analog electric signal corresponding to reflectivity of light using a CCD sensor and converts this to multi-gradation digital image data. In the image processing system, the image data obtained at the image input terminal are processed, thus carrying out various processings such as amending, conversion, editing, etc. In the image output terminal, laser of the laser printer is turned on and off by the image data processed in the image processing system, and halftone image is outputted.

In such digital copying machine, multi-gradation image data can be outputted according to the types through processings by the image processing system, e.g. a binary image such as characters can be outputted as sharp image with enhanced edge, while middle tone image such as photographs can be outputted as a smoothed image or as a color image with high reproducibility and sharp definition. Further, it is also possible to output an image, which has been processed from the manuscript by painting, color conversion, trimming, shift, synthesizing, scaling up and down and other edit processings. To this image processing system, the image input terminal outputs image data by reading the manuscript with signals through color separation into 3 primary colors of R (red), G (green) and B (blue). The image output terminal processes the image to halftone image for each toner of Y (yellow), M (magenta), C (cyan) and K (black), overlapps them and outputs. Thus, a color digital copying machine is provided.

Next, description will be given on a color digital copying machine as described above and already proposed (e.g. Japanese Provisional patent Publication No. 2-223275), referring to FIG. 1.

In FIG. 1, IIT (image input terminal) 100 reads a color manuscript through color separation to 3 primary colors of B, G and R using a CCD line sensor and converts this to digital image data. IOT (image output terminal) 115 reproduces color image through exposure and development by laser beam. The components between IIT 100 and IOT 115, i.e. from END conversion circuit 101 to IOT interface 110, constitute an edit processing system of the image data (IPS: image processing system). The edit processing system converts the image data of B, G and R to toner signals of each toner of Y, M and C, and K, and the toner signal corresponding to the developed color is outputted to IOT 115 for each developing cycle.

IIT 100 reads one pixel in size of 16 dots/mm for each of B, G and R using a CCD sensor, and the data are outputted in 24 bits (3 colors×8 bits; 256 gradations). CCD sensor is provided with filters of B, G and R on its upper surface, and it is 300 mm in length with density of 16 dots/mm. IIT 100 scans 16 lines/mm at a process speed of 190.5 mm/sec. using this CCD sensor, and reading data are outputted at a speed of approximately 15M pixels/sec. for each color. IIT converts to density information from reflectivity information through log conversion of analog data of pixels of B, G and R, and the data are further converted to digital data.

In IPS, color separation signals of B, G and R are inputted from IIT 100, and various data processings are performed in order to increase color reproducibility, gradation reproducibility and definition reproducibility. After converting to toner signals of Y, M, C, and K, toner signals of the developed process color are converted to ON/OFF signals and are outputted to IOT 115. An END (equivalent neutral density) conversion module 101 is to adjust (convert) to color signal with gray balance. A color masking module 102 converts the signals of B, G and R to signals corresponding to toner quantity of Y, M and C through matrix computation. A manuscript size detecting module 103 detects manuscript size in pre-scanning and performs erasing (frame erasing) of platen color in manuscript reading scanning. A color conversion module 104 converts colors specified in a specific area according to an area signal inputted from an area image control module. UCR (under color removal) and black generation module 105 generates adequate quantity of black in order to prevent color turbidity, reduces quantity of Y, M and C depending on the above quantity, and gates K signal and the signals after under-color removal of Y, M and C according to each signal of mono-color mode and 4 full-color mode. A space filter 106 is a non-linear digital filter provided with blur restoring function and moiré removing function. A TRC (tone reproduction control) module 107 is to perform density adjustment, contrast adjustment, negative-positive conversion, color balance adjustment, etc. to improve reproducibility. A scaling up/down module 108 is to scale up or down in main scanning direction. The scaling up and down in sub-scanning direction is performed by adjusting scanning speed of the manuscript. A screen generator 109 converts gradation toner signal of process color to binarized toner signal of ON/OFF and outputs it. This binarized toner signal is outputted to IOT 115 through an IOT interface module 110. An area image control module 111 comprises an area generation circuit and a switch matrix. Edit control module consists of an area command memory 112, a color pallet video switch circuit 113, a font buffer 114, etc. and performs various editing controls.

The area image control module 111 comprises 7 rectangular areas, and priority can be set in an area generation circuit. Area control information is set in switch matrix corresponding to each area. As the control information, there are color conversion, color mode such as mono-color or full-color, modulation select information such as photograph, characters, etc., TRC select information, screen generator select information, etc., and these are used for control of color masking module 012, color conversion module 104, UCR module 105, space filter 106 and TRC module 107. The switch matrix can be set by software.

The edit control module reads a manuscript of circular graph and not rectangle, and performs edit processing such as painting for painting a specified area with indefinite shape with a specified color, or netting, trimming, masking, etc. For this purpose, 4-bit area command is written in 4 plane memories, and editing command for each dot of the manuscript is set up with 4 bits by 4 plane memories.

In a color digital copying machine with the above arrangement, it is often necessary to enlarge, reduce or move the editing area after editing instruction such as color conversion, netting, painting, etc. has been executed. In case the editing area is set in the editing instruction, e.g. when the manuscript is placed on a digitizer and an area is inputted and specified, its position is displayed. In case the specified editing area is to be corrected, selected screen and corrected screen are used.

To correct the editing area, a plurality of editing areas and forward/backward keys are displayed, and the selected area in the displayed screen is inverted in display. By forward/backward key, the selected area is moved forward or backward on the selected screen according to the order of the setting to select an area. Then, it is switched over to an amended screen, and correction keys such as arrow or triangle are displayed for rectangle and its sides (upper, lower, left and right). Each time this correction key is operated, correction processing of enlargement/reduction of 1 mm in the direction of the arrow or the triangle is performed.

In the example shown in FIG. 2, a selection sheet where the numbers of correction areas shown in A are given as selection keys, and a dimension correction sheet where scaling up/down designation keys are given on a rectangle and its upper, lower, left and right sides shown in B are attached on an edit pad, and edit instructions and subsequent area correction are carried out on the edit pad. In this case, the copy is placed on the edit pad to set an area in the setting mode. In correction mode, it is selected to which area it has been inputted by the number of the selection key on the selection sheet of the area, and the area is corrected by the scaling up/down instruction keys on the dimension correction sheet. To correct the area in this case, correction of 1 mm can be performed by one operation.

However, in the conventional area correction system as described above where there are the selected screen and the corrected screen, each setting area is displayed on the selected screen, while it is impossible to match each area with the manuscript. For this reason, it is impossible to confirm accurate position on the manuscript. In the amended screen, the rectangle is displayed only to give the relationship with the correction key, and it does not change the size or move in response to the set edit area and to the correction. Accordingly, even when a correction key is used, the content of the correction corresponding to it cannot be concretely confirmed.

In a system where a selection sheet as in the latter case is used, the area must be selected by the number on the selection sheet on the edit pad to correct the area. Thus, the operator must memorize the number of the selection key and contents of area and editing. This often leads to erroneous specifying due to erroneous memorizing. The area is corrected by the scaling up/down designation key on the dimension correction sheet as in the former case in the above, and the content to be corrected cannot be concretely confirmed.

SUMMARY OF THE INVENTION

It is an object of the present invention to provide a method, by which positional relationship with a manuscript can be confirmed in correcting an editing area. It is another object of the invention to provide a method, by which content can be confirmed by correction operation.

To attain the above objects, the image processing system having an editing functions and for editing and outputting image information obtained by reading a manuscript according to the present invention comprises an image processing unit for editing and outputting image information obtained by reading a manuscript, input means for inputting editing instructions including editing area and editing content, display means for displaying an area of editing instruction, edit processing means for processing the inputted editing instruction and for setting editing instruction to the image processing unit, and it is characterized in that the editing content of said area is displayed on display means by instruction of the editing area, and in correcting the editing area, the editing area to be corrected is changed according to the correction.

Further, the present invention is characterized in that correction content of the editing area is determined by specified position of the area or by the number of specifying the area, that editing content and numerical value of correction are displayed at positions not displayed on the editing area to be corrected, and further that the display means consists of a bit map display for overlapping the editing area on manuscript image and displaying and a character display for displaying numerical values and characters, and the corrected amount is displayed on the character display in numerical values.

In the above arrangement, when editing instruction including the editing area or editing content are inputted from the input means, editing content of said area is displayed on the display means by instruction of the editing area. In correcting the editing area, the editing area to be corrected is changed according to the correction, and the inputted editing instruction is processed by edit processing means and editing instruction is set in the image processing unit. Thus, the editing content of the area and the corrected content can be confirmed on the display screen. Further, by overlapping and displaying the manuscript on the display means, it is easier to confirm positions on the manuscript. This reduces errors in specifying. Using a bit map display for overlapping and displaying editing area on manuscript image or a character display for displaying numerical values and characters as the display means, the corrected amount is displayed on the character display in numerical values, and the corrected amount can be quantitatively confirmed.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
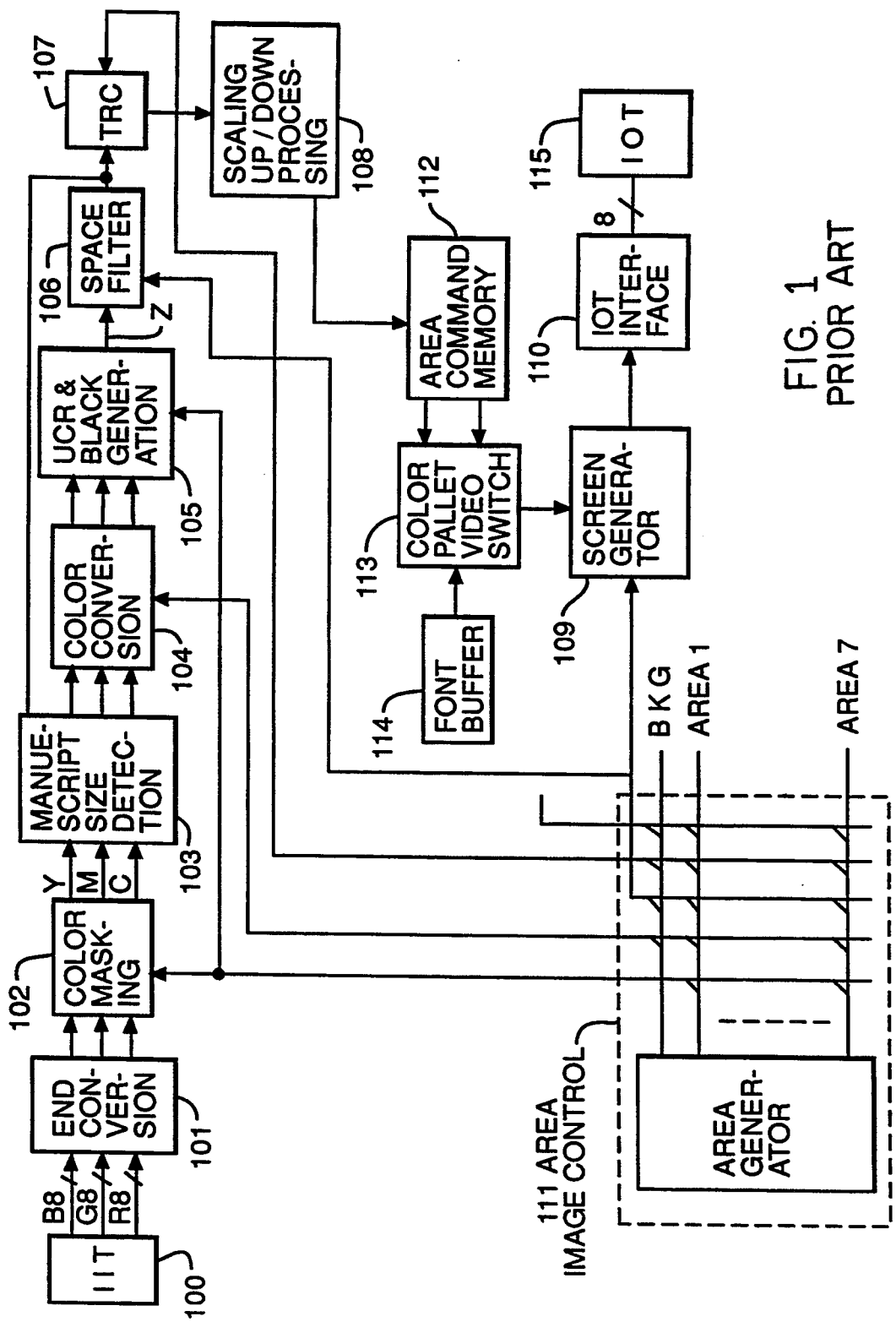
FIG. 1 is a block diagram showing an arrangement of a color digital copying machine provided with conventional editing functions.
Figure 2:
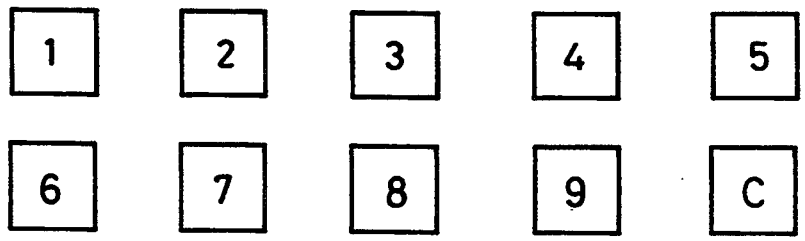
FIG. 2 is an example of another method for area correction.
Figure 2:
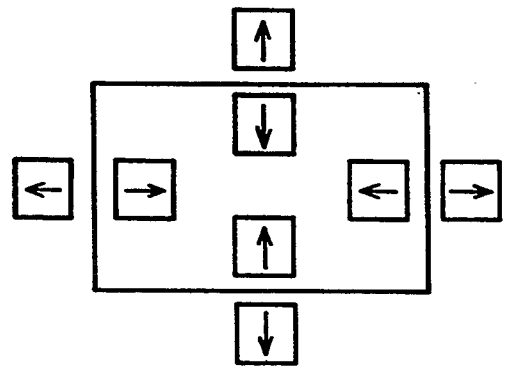
Figure 3:
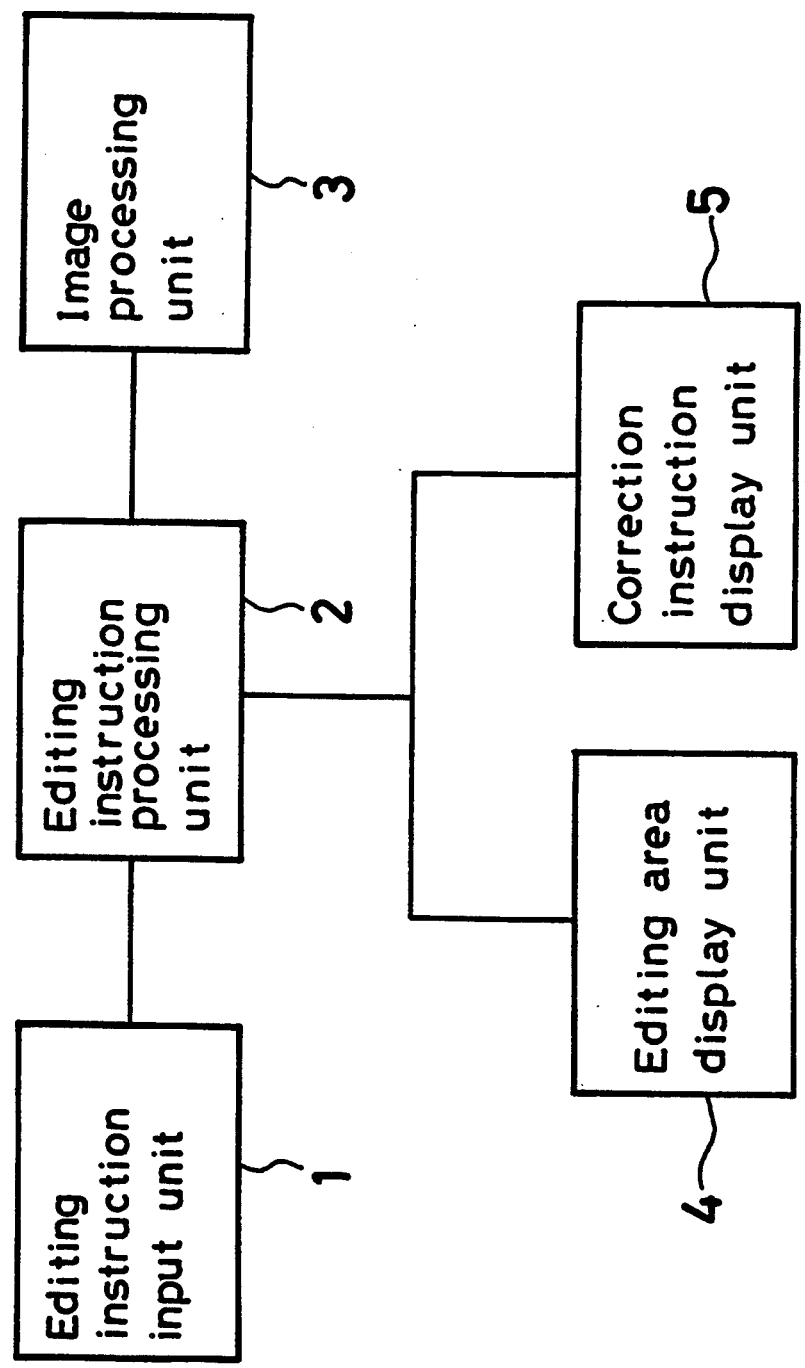
FIG. 3 is a diagram showing an embodiment of an editing area correction method of an image processing system according to the present invention.

In FIG. 3, an editing instruction input unit 1 selects and specifies editing functions such as painting, color conversion, trimming, rotation, etc. using an edit pad, a console panel, a keyboard, and a touch panel attached to display, and it instructs the content and corrects the editing area. An editing area display unit 4 displays the editing area specified and inputted from the editing instruction input unit 1 on a manuscript image, and a correction instruction display unit 5 displays information relating to correction when the editing area is corrected, and further displays the editing content. An editing instruction processing unit 2 picks up image data of the manuscript from an image processing unit 3 and displays on the editing area display unit 4, and displays the editing instruction and correction content inputted from the editing instruction input unit 1 on the editing area display unit 4 and the correction instruction display unit 4. It also sets the editing content to the image processing unit 3. The image processing unit 3 is, for example, a digital copying machine, which consists of an image processing system provided with various editing functions and is connected to an image input terminal (IIT) and an image output terminal (IOT). Further, an example of hardware arrangement of the entire image processing system is given in FIG. 4.

Figure 4:
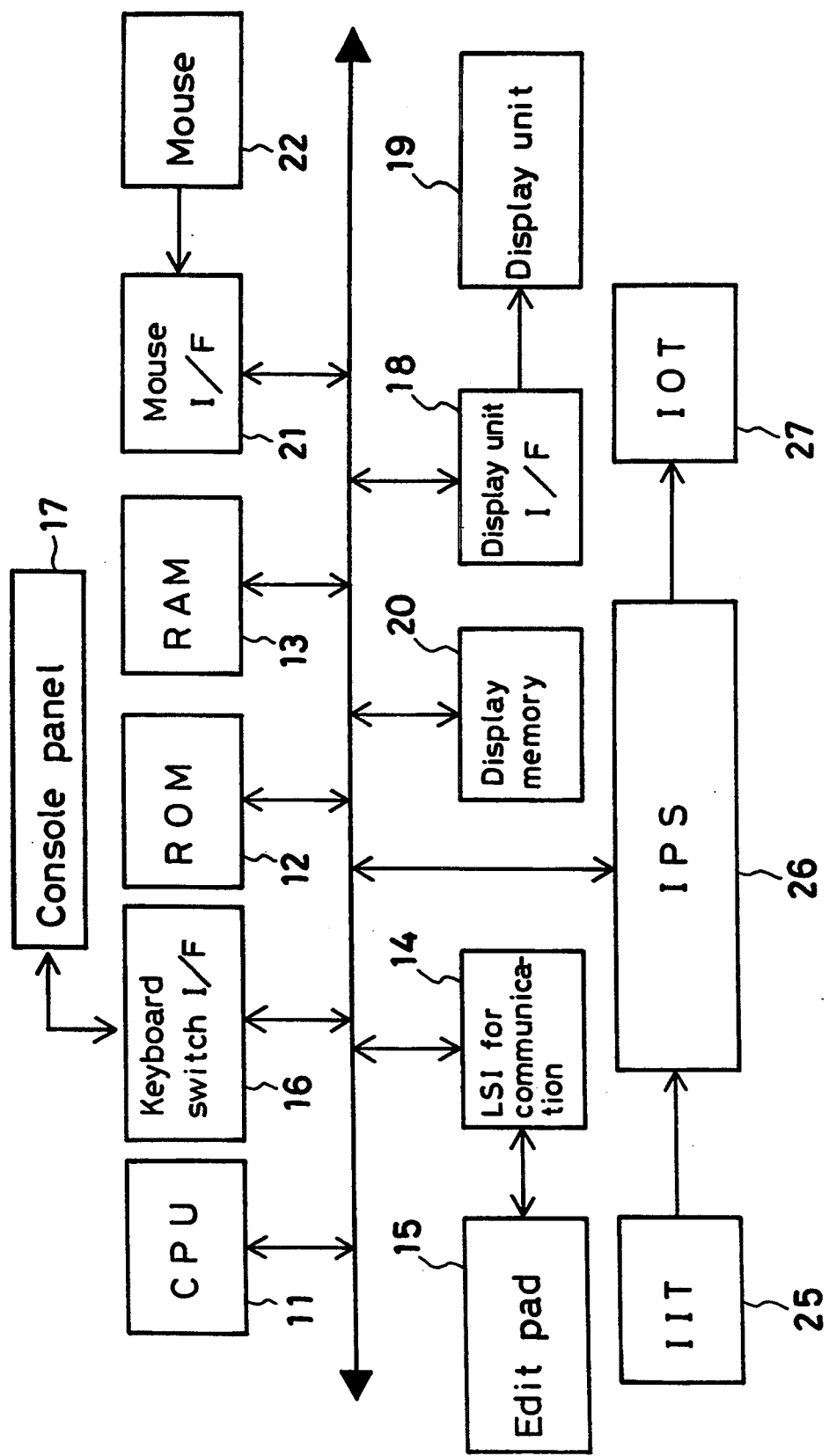
FIG. 4 is a system block diagram of an entire image processing system.

In FIG. 4, IIT 25 is an image input terminal for reading the manuscript by a CCD sensor, and IPS 26 is an image processing system for performing editing and other processings to the image data. IOT 27 is an image output terminal for outputting a copy by driving, for example, a laser printer by the image data. These components make up a conventional type digital copying machine as already described.

An edit pad 15 is to specify an input editing area when various editing functions (contents) are used. A console panel 17 performs key input such as function selection and confirmation in case various editing functions are used, and confirms and displays numerical values using a display (character display). A display unit 19 displays manuscript or editing area, editing content and correction content depending upon the editing area specified and inputted from the edit pad 15. For example, it is a bit map display. A display memory 20 develops and stores display data such as a manuscript or an editing area to be displayed on the display unit 19. A mouse 22 is to move a cursor on the screen of the display unit 19.

CPU 11 processes input of the console panel 17, the edit pad 15 and the mouse 22, develops the display memory 20 and processes display output of the display unit 19. It also checks the selected editing content, and sets editing instruction to IPS 22. ROM 12 stores programs and data necessary for this purpose, and RAM 13 is used as a working area for processing and executing programs and maintains the data under processings or other necessary data.

The setting of the editing instruction and area correction are carried out as follows:

The editing content is selected by key selection on the console panel 17, and the selection information is transferred from keyboard switch I/F 16 to CPU 11. When the editing content is selected, CPU 11 switches over the processing mode to input mode of the editing area and waits that the editing area is specified and inputted from the edit pad 15. The input data of the editing area are sent to LSI 14 for serial communication through communication line from the edit pad 15. CPU 11 writes the input data to RAM 13 on CPU bus and develops display data of the area to the display memory 20. On the display memory 20, image data of the manuscript is developed by CPU 11. Therefore, the editing area is overlapped and developed on the manuscript images, and these images are displayed on the display unit 19 through a display unit I/F 18. In this case, the display unit 19 may have lower resolution because it will suffice if positional relationship between the manuscript and the editing area can be confirmed. When the editing area is confirmed by the display unit 19 and the editing instruction is confirmed by the console panel 17, CPU 11 sets editing instruction to IPS 26.

To correct the editing area already set, correction instruction is given from the console panel 17. CPU 11 displays the manuscript and each editing area to the display unit 19, and the selected area is displayed in display mode different from that of the other areas such as flashing or inverted display. When cursor is moved and clicked by the mouse 22 operated by the operator, display mode of the area is changed as a newly selected area, and the editing content of this area is displayed at a corner of the screen for a certain period of time. For example, the screen is divided to upper and lower sections or left and right sections. If the selected area is in upper section, the editing content is displayed in lower section, and it is erased after a certain period of time elapsed.

It will suffice that the editing content can be confirmed when the area is selected, and it is no more needed thereafter. Therefore, such information should be erased after a certain period of time from the screen of the display unit 19. By erasing useless display information, complications on screen can be avoided.

After the area is selected and the content is confirmed, area correction is performed by operation of the mouse 22 by the operator. In this correction, CPU 11 selects the content according to the position and the mode of clicking of the cursor. In case clicking position of cursor is at the center of side of the selected area, the side is moved outwardly or inwardly. In case it is at a corner, the corner, i.e. two sides are moved. In case it is at the center, the entire area is moved to correct the content. After this selection, the display area is moved by moving the cursor, and the area is corrected. At the same time, correction amount of the area is displayed in numerical value on the display (character display) on the console panel 17. Accordingly, the operator can confirm the area after correction by the change of the area overlapped on the manuscript and displayed on the screen of the display unit 19 and by numerical value of correction amount displayed on the display of the console panel 17.

In case the cursor is clicked twice, the area is copied at other position. In case it is clicked three times, the area may be erased. This can be used not only for the area correction but in the setting.

Next, description will be given on the operation by editing area correction function of the image processing system.

Figure 5A:
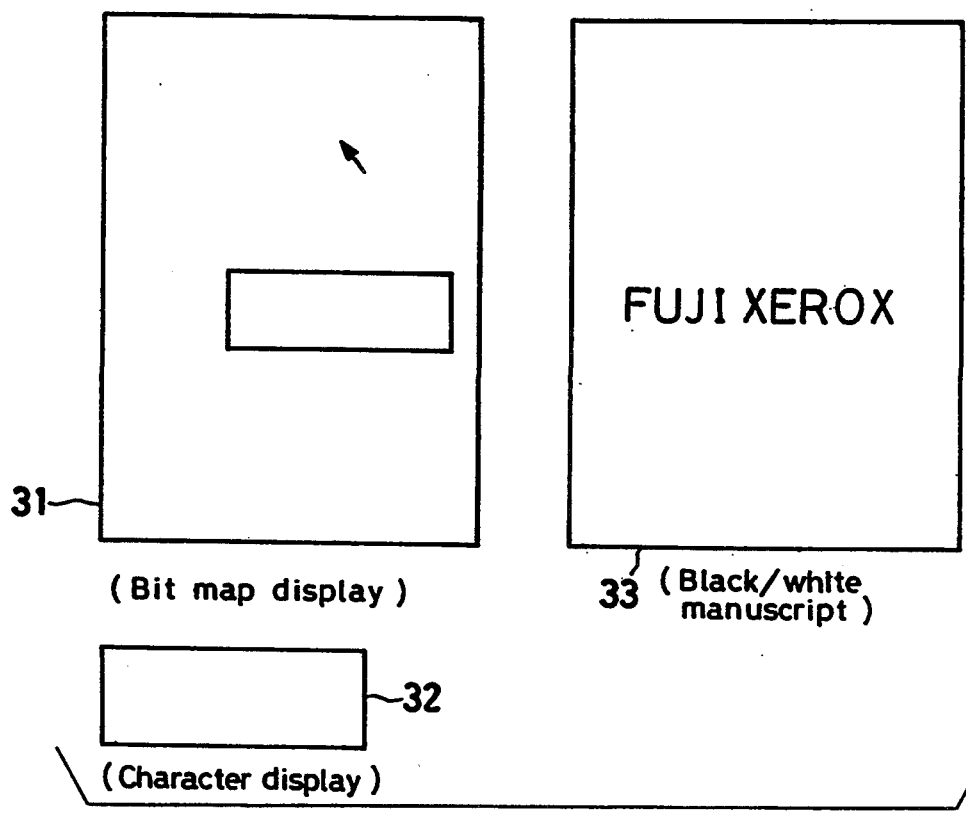
FIG. 5 shows examples of operation by the editing area correction method of the image processing system according to the present invention.

First, the manuscript 33 shown in FIG. 5A is placed on the edit pad and the editing of "black→blue conversion" is performed to the letters of "XEROX". When editing instruction is given, editing position is displayed on the bit may display 31. The marking ↑ is a cursor indicating the instructed position of the mouse.

Figure 5B:
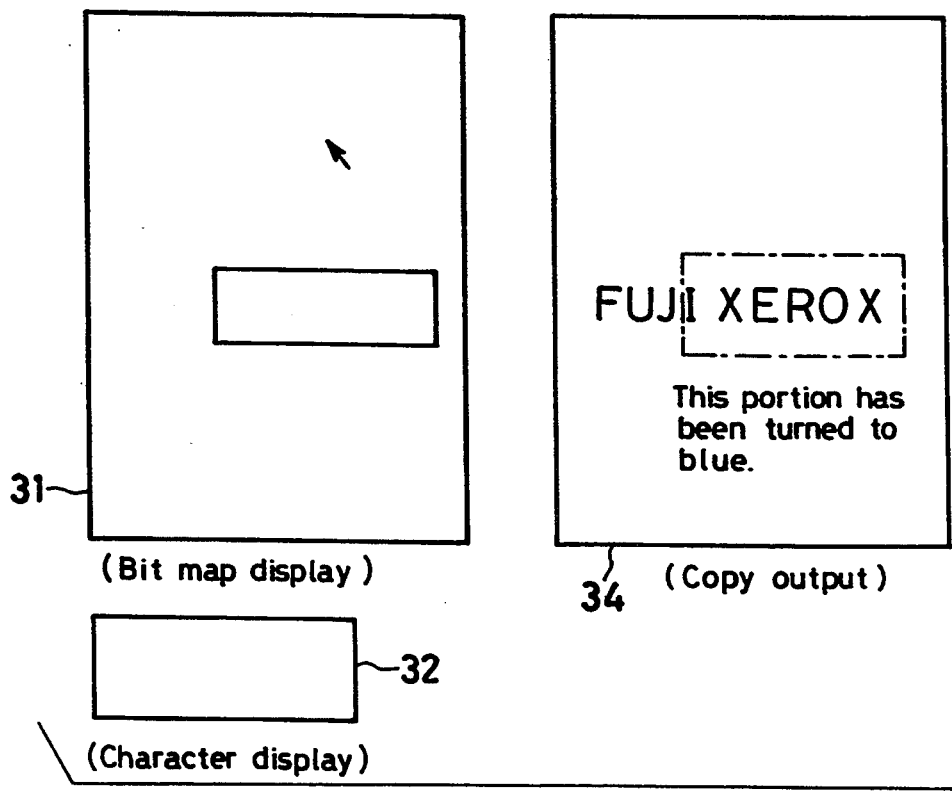

When copying is made by the above editing instruction, it is necessary to correct the editing position in case "black→blue conversion" has been performed up to a part of the letters "JI" as shown in FIG. 5B. That is, the area shown by one dot chain line of copy output 34 corresponds to a rectangular area on the bit map display 31 and shows the area of "black→blue conversion".

Figure 5C:
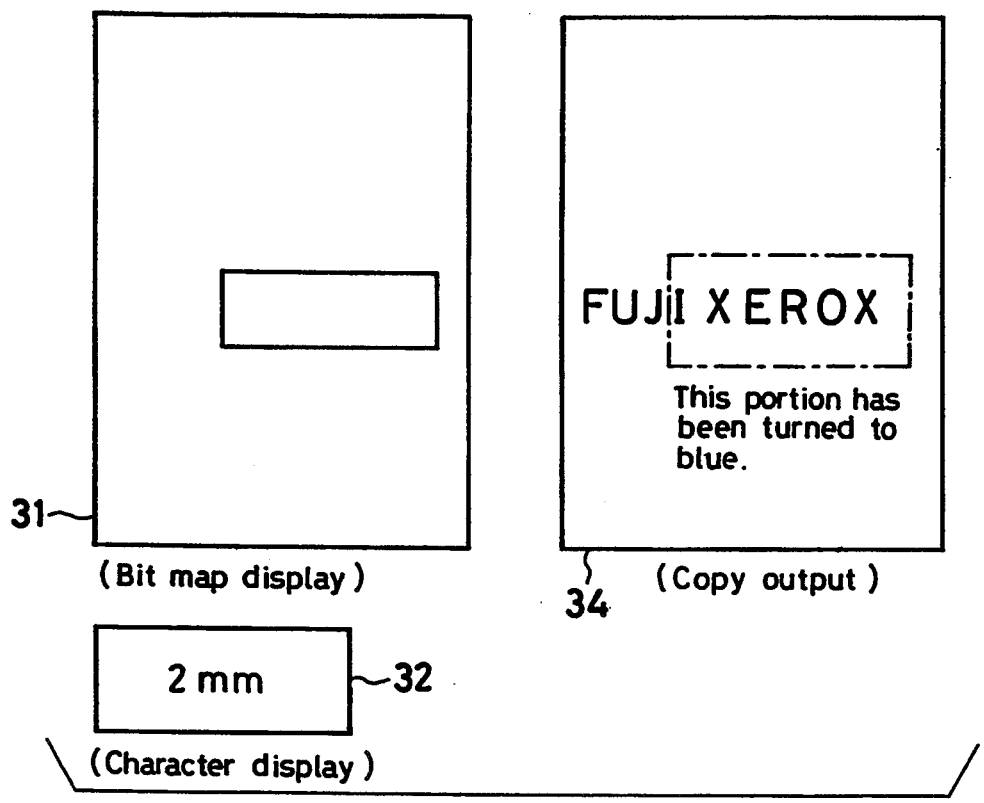
Figure 5D:
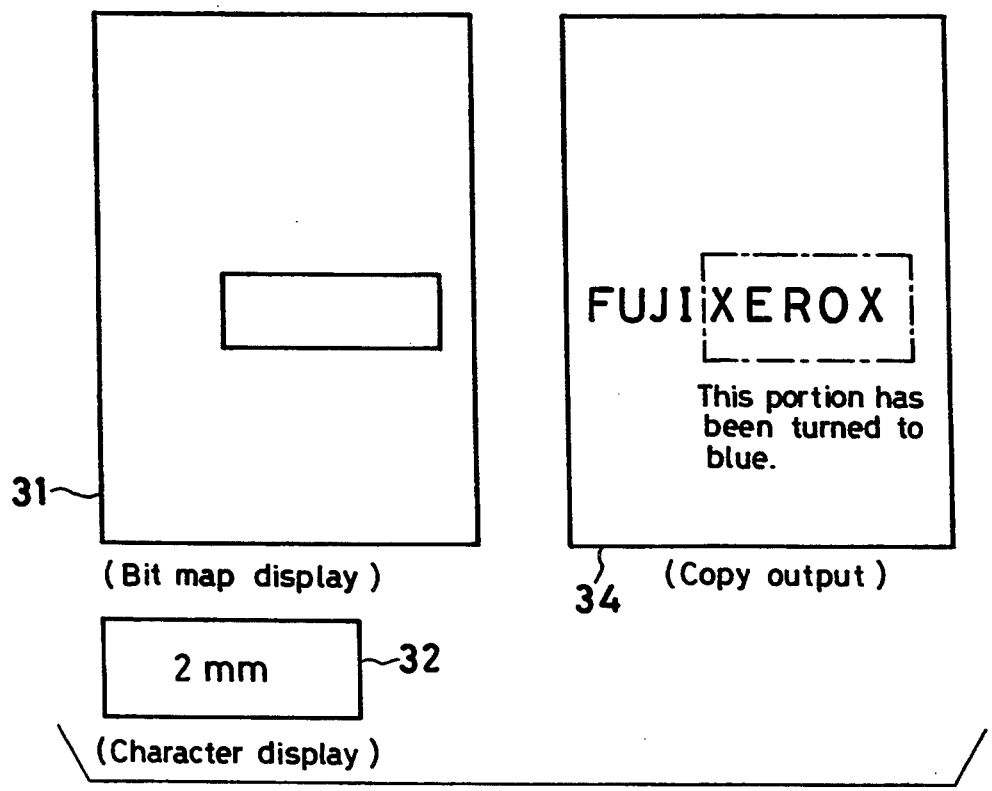

If it is supposed that adequate position is obtained if it is moved to the right by 2 mm, the operator operates the mouse as shown in FIG. 5C, and after clicking the cursor shown by the marking ↑ at the center of the left side of the editing area on the bit map display 31, it is moved to the right. To cope with this movement, CPU 20 moves the left side of the rectangular editing area on the bit map display 31 and displays the moving distance on the character display 32. Because the moving distance on the bit map display 31 does not correspond to the manuscript by 1:1, the content of the area correction is visually displayed on the bit map display 31. By displaying the correction amount in numerical values on the character display 32, the content of correction can be confirmed visually and in numerical values. The operator confirms the moving distance by these displays and completes the movement by clicking the button of the mouse again. As shown in FIG. 5D, a copy 34 can be outputted by editing "black→blue conversion" to the letters "XEROX".

It is needless to say that the present invention is not limited to the above embodiments, and various changes and modifications can be made without departing the spirit and scope of the invention as set forth herein. For example, in the above embodiments, description has been given using bit a map display and a character display, whereas the other display unit may be used as far as the positional relationship between the manuscript and the editing area can be confirmed by overlapping and displaying the editing area on the manuscript even though in lower resolution. Or, the manuscript may be displayed by binarized image or the manuscript image may be omitted by displaying longitudinal and lateral lines in form of net so that the approximate positional relationship of the manuscript can be confirmed. The cursor is moved by the mouse to select the area and to instruct the correction, while a touch panel may be adopted instead of a mouse by attaching it on the display. Further, the correction amount is displayed in numerical values on character display in the above, while display may be made using a portion where the area to be corrected is not displayed as in the case of displaying the editing content, or the editing content may be displayed on the character display.

As it is evident from the above description, the editing area is overlapped and displayed on the manuscript image and the editing content is displayed by position instruction according to the present invention. This makes it easier to confirm the editing position and content, to confirm the correction content because the area display follows up the instruction of correction, and to reduce erroneous specifying in the correction of the editing area. Further, because special position of the area is specified and correction content is selected, it is easier to instruct the correction and this improves maneuverability of the system.

What we claim is:

1. An image processing system with editing functions for editing and outputting image information obtained by reading a manuscript, and for performing edit processing on said image information to give editing content to an editing area of said manuscript, comprising:

image processing means for performing said edit processing based on an edit instruction that relates both to said editing area and said editing content, and for outputting corrected image information;

input means for supplying said edit instruction including said editing area and said editing content and for supplying a correction of said edit instruction;

display means for displaying said editing area of said edit instruction overlapped on said manuscript image information and for displaying said editing content, and information relating to correction when the editing area of the manuscript image information is being corrected; and edit processing means for receiving said edit instruction supplied from said input means, for processing an input correction of said edit instruction, for performing display control of said display screen and for supplying said edit instruction with the correction to said image processing means, wherein said display means displays a corrected editing area overlapped on said image information in a selected condition and displays said corrected editing area in a display mode different from that of the originally displayed said editing area; and said display means displays editing content of said edit instruction and the correction of the editing content in an area where said corrected editing area is not displayed, and the editing content and the correction of the editing content are displayed only for a given period of time.

2. An image processing system according to claim 1, wherein image memory means is provided for storing manuscript image information received from said image processing means, and said display means displays the manuscript image information received from said image memory means in said corrected editing area by overlapping.

3. An image processing system according to claim 1, wherein said display means comprises a bit map display for displaying said manuscript image information having said corrected editing area overlapped on said manuscript image information and a character display for displaying numerical values and characters, and the amount of correction of said corrected editing area is displayed on said character display.

4. An image processing system according to claim 1, wherein said edit processing means determines the correction of said edit instruction, based on an editing position specified on said corrected editing area displayed by said display means, from said editing area and editing content input means and numerical values of said character display.

5. An image processing system according to claim 1, wherein said edit processing means divides an area of display screen displayed by said display means in longitudinal and lateral directions and processes each area according to position, angle and overall movement of the editing area.

6. An image processing system with editing function for editing and outputting image information obtained by reading a manuscript and performing edit processing, comprising:

image input means for obtaining image information by reading said manuscript;

image processing means for performing said edit processing upon receiving said image information from said image input means;

image outputting means for outputting image information after edit processing from said image processing means;

editing content input means for inputting editing content of said edit processing and correction of editing content;

editing area input means for inputting editing area of said edit processing;

edit memory means for storing editing information consisting of said editing content of said edit processing and said editing area;

display memory means for developing and storing said editing area on a bit map by overlapping said editing area on said image information;

display means for displaying said bit map of said display memory means; and edit processing means for performing processing of said editing content and said editing area based on each input of said editing content input means and sad editing area input means, for correcting said editing information read from said edit memory means, for storing said corrected editing information to said edit memory means, for developing and storing said corrected editing area of said bit map of said display memory means, and for sending said edit information stored in said edit memory means to said image processing means.

7. An image processing system with editing function for editing and outputting image information obtained by reading a manuscript comprising;

image inputting means for reading said manuscript and obtaining manuscript image information;

image processing means for performing edit processing by inputting said manuscript image information from said image inputting means;

image output means for outputting image information processed by said edit processing from said image processing means;

editing content input means for inputting editing content of said edit processing and correction of editing content;

editing area input means for inputting editing area of said edit processing;

edit memory means for storing edit information including said editing content of said edit processing and said editing area;

display memory means for developing said editing area by overlapping said editing area on said manuscript image information;

display means for displaying a bit map of said display memory means; and edit processing means for correcting said editing content and editing area of said edit processing inputted from each of said editing content input means and said editing area input means, for storing said edit information in said edit memory means, for developing said bit map of said display memory means, and for sending said edit information stored in said edit memory means to said image processing means.

8. An image processing system according to claim 7, wherein said editing content input means comprises a console panel having keys for selecting and confirming functions and a character display for confirming and displaying numerical values and for inputting said correction of editing content.

9. An image processing system according to claim 7, wherein said editing area input means comprises an editing pad for inputting said editing area.

10. An image processing system according to claim 7, wherein said display means is a bit map display for displaying said bit map of said display memory means.

11. An image processing system according to claim 7, wherein said display means displays said editing area under a selected condition in a display mode different from that of a previously displayed editing area.

12. An image processing system according to claim 7, wherein said display means displays content of said edit instruction and content of said correction in an area where said editing area to be corrected is not displayed.

13. An image processing system according to claim 7, wherein said display means displays content of said edit instruction or content of said correction only for a given period of time.

14. An image processing system according to claim 7, wherein said display means displays said manuscript image information to said editing area by overlapping said manuscript image information.

15. An image processing system according to claim 7, wherein said edit processing means determines correction of said editing content of said edit instruction based on editing position entered by said editing content input means and on number of times entered with respect to an area displayed by said display means.

* * * * *